United States Patent
Shaikh et al.

(10) Patent No.: US 12,541,632 B1
(45) Date of Patent: Feb. 3, 2026

(54) CONGESTION AWARE PLACEMENT OF FABRIC COMPONENTS

(71) Applicant: Amazon Technologies, Inc., Seattle, WA (US)

(72) Inventors: Sharukh Shahajahan Shaikh, San Jose, CA (US); Arun Kumar, Mountain View, CA (US); Kun Xu, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 651 days.

(21) Appl. No.: 18/066,769

(22) Filed: Dec. 15, 2022

(51) Int. Cl.
  *G06F 30/392* (2020.01)
  *G06F 30/394* (2020.01)
  *G06F 115/02* (2020.01)

(52) U.S. Cl.
  CPC .......... *G06F 30/392* (2020.01); *G06F 30/394* (2020.01); *G06F 2115/02* (2020.01)

(58) Field of Classification Search
  CPC ........ G06F 30/30; G06F 30/33; G06F 30/392; G06F 30/394; G06F 30/398; G06F 2115/02; G06F 2115/06; H10D 89/10
  USPC .......................................................... 716/119
  See application file for complete search history.

(56) References Cited

U.S. PATENT DOCUMENTS

| 2013/0174113 A1* | 7/2013 | Lecler | .................. G06F 30/392 716/122 |
| 2014/0115298 A1* | 4/2014 | Philip | .................. G06F 30/394 712/29 |

OTHER PUBLICATIONS

U.S. Appl. No. 18/064,574, inventors Shaikh et al., filed Dec. 12, 2022.

* cited by examiner

*Primary Examiner* — Paul Dinh
(74) *Attorney, Agent, or Firm* — Weaver Austin Villeneuve & Sampson LLP

(57) ABSTRACT

Techniques are provided for congestion aware placement of the fabric components of an interconnect in an integrated circuit device. A floorplan of the interconnect is projected on a virtual grid that includes placement locations for the fabric components. Locations of the fabric components can be initialized with the placement locations of the virtual grid. Updated locations for the placement of each of the fabric components on the virtual grid can be determined based on minimization of a total wirelength (TWL) cost function of all the nets in the interconnect. Timing slices are inserted in the interconnect after the placement of the fabric components at the updated locations. The floorplan information with the placement information of the fabric components and the timing slices can be used for the physical design of the interconnect to provide a timing clean result.

20 Claims, 13 Drawing Sheets

CONGESTION AWARE PLACEMENT OF FABRIC COMPONENTS

BACKGROUND

A System-on-a-Chip (SoC) may include an interconnect fabric to connect a plurality of on-chip components of an SoC. The plurality of on-chip components may include memory devices, processors, accelerators, direct memory access (DMA) engines, physical layer (PHY) devices, or input/output (I/O) devices, that may operate as initiators and/or targets to exchange data with one another via the interconnect fabric. The interconnect fabric may include multiplexers, demultiplexers, registers, and other suitable fabric components to facilitate data transfer between various initiators and targets.

BRIEF DESCRIPTION OF THE DRAWINGS

Various embodiments in accordance with the present disclosure will be described with reference to the drawings, in which.

DETAILED DESCRIPTION

Figure 1:
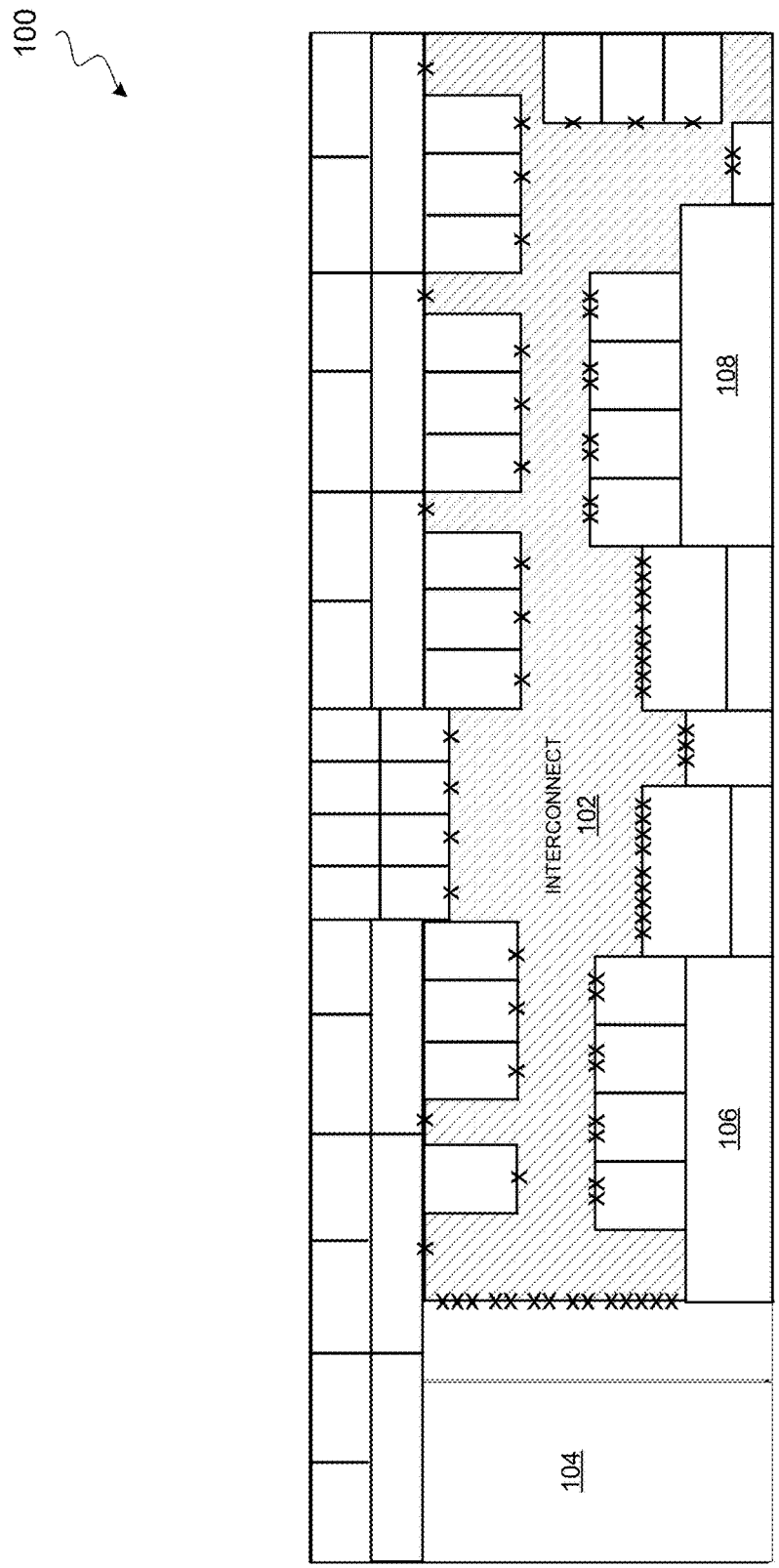
FIG. 1 illustrates an example floorplan for an integrated circuit (IC) device.

A system-on-a-chip (SoC) may include a plurality of on-chip components on one or more dies to provide high performance and computing power demanded by modern-day applications. The plurality of on-chip components may include memory devices, processors, accelerators, DMA engines, PHY devices, or I/O devices that may operate as initiators and/or targets to exchange data with one another via an interconnect fabric using corresponding communication ports. The communication ports may include initiator ports that can be input ports to the interconnect fabric, and target ports that can be output ports of the interconnect fabric. The communication between the on-chip components can be performed using any suitable bus protocol, e.g., Advanced extensible Interface (AXI), AXI Coherency Extensions (ACE), or Coherent Hub Interface (CHI), among other examples.

In most cases, an initiator can communicate with multiple targets, or multiple initiators can communicate with the same target. Some systems may utilize a sparsely connected interconnect fabric for data transfer between a large number of initiators and targets to achieve high performance using point-to-point connection between each initiator and a corresponding target. The interconnect fabric may include multiple fabric components to facilitate the data transfer between various initiators and targets using point-to-point connections. For example, the interconnect fabric may include a demultiplexer (demux) to provide connectivity between an input port and multiple output ports, and a multiplexer (mux) to provide connectivity between multiple input ports and an output port.

In some implementations, each mux may append an identifier (ID) bit to each signal that goes through that mux that can be used to back track that signal to its source. An ID compressor can be used to compress the ID bits to a width that is suitable for the corresponding target. The interconnect fabric may also include pipelining registers to provide timing slices to traverse the on-chip distance between the input ports and the output ports, and to spread out fabric components to reduce congestion. For an IC device with a large number of initiators and targets coupled to a sparsely connected interconnect fabric, a number of fabric components may be used to facilitate the data transfer between the large number of initiators and targets using point-to-point connections.

Generally, the cell count for a large design can be enormous which can make the physical design (PD) of the SoC challenging, and can result in congestion overflow due to a large number of wires connecting different components of the SoC. In some cases, an initial floorplan of various on-chip components of the SoC (e.g., hard macros and standard cells) can be provided for timing and routability, and PD information comprising the placement information of the on-chip components can be generated. The PD information may also include area information to implement the interconnect fabric. Generally, the interconnect fabric has to fit in the left-over floorplan space available in the chip area not occupied by the SoC components, which may include various notches and narrow channels. Thus, the placement of various fabric components of the SoC interconnect may not be uniform, which can add to the placement and routing challenges. Additionally, when the interconnect fabric includes multiple large multiplexers that receive communication from different input ports, the routing congestion can be further exacerbated.

In some implementations, the PD information can be used to build the large multiplexers in the interconnect fabric with hierarchical multiplexer (or mux) trees to reduce the routing congestion. The timing slices can be inserted on pathways between the initiators, hierarchical muxes and the targets to traverse the distance between them depending on the floorplan and the locations of the hierarchical muxes. However, without the PD information related to placement of the hierarchical muxes by the backend tools, the timing slices cannot be inserted optimally for a timing clean design. Thus, in most cases, multiple iterations of the design and re-design of the SoC followed by the design of the interconnect fabric have to be performed to close the SoC interconnect timing. These iterations can be time consuming and costly, especially for large designs with millions of cells.

Today's short time-to-market requirements for the SoCs demand shorter timeframes for the design cycle. However, the interconnect fabric can be a major sources of long timing paths that stretch across congested areas of the floorplan. In most cases, the timing closure phase of the SoC interconnect fabric can be an inefficient process with uncertainty, and can delay the SoC development cycles. Some implementations may overdesign the interconnect fabric by inserting the timing slices conservatively, which can lead to excess power consumption, increased chip area, and increased round trip latency, thus ultimately impacting the SoC performance.

The techniques described herein can be used to optimally insert timing slices in an interconnect fabric by performing congestion aware placement of the fabric components, given the floorplan information of the interconnect fabric. The floorplan information may indicate an area to implement the interconnect fabric (or an interconnect area), and the placement locations of the initiator ports and the target ports in the floorplan. In some embodiments, placement of the fabric components can be projected on grid points of a virtual grid in the given interconnect area. The virtual grid may provide more grid points than the number of the fabric components in the interconnect fabric to allow movement of the fabric components to achieve optimal placement.

Initially, locations of the fabric components can be randomly assigned with legal placement locations in the virtual grid represented by the grid points. Next, updated locations for the placement of the fabric component on the virtual grid can be determined such that a total wirelength (TWL) cost function of all the nets in the interconnect area can be minimized. An updated location for each fabric component can be determined by performing a location swapping operation followed by a location insertion and stretching operation until the TWL improvement with the updated locations is less than a threshold. The timing slices can be inserted after the placement of the fabric components at the updated locations in the floorplan based on the distance between the initiator/target ports, and the fabric components.

A location swapping operation for each given fabric component can be performed to swap an initial location of the fabric component with another location in the virtual grid. For example, a location on the virtual grid for a fabric component can be determined that has an optimal half perimeter wirelength (HPWL) of connections to the fabric component. In some examples, the location on the virtual grid for the fabric component having the optimal HPWL is a median of x-coordinates and y-coordinates of the locations of the fabric components that are connected to that fabric component. A respective improvement in the HPWL can be determined when the initial location of the given fabric component is swapped with each grid point within a region surrounding the location of the HPWL. The location of the given fabric component can be swapped to a new grid point within the region that has a highest HPWL improvement.

A location insertion and stretching operation can be performed for each fabric component after performing the location swapping operation to further update the location of the fabric component. For example, for each fabric component, a location on the virtual grid for the placement of the given fabric component that has an optimal HPWL of connections to the given fabric component can be determined, and the given fabric component can be moved to a grid point corresponding to that location. If there is already another fabric component at that location, then the other fabric component can be moved to a nearest empty grid point on the virtual grid. A respective HPWL for each fabric component that has moved to an updated location can be computed, and each fabric component that has an improvement in the respective HPWL can be placed at the corresponding updated location.

The floorplan information with the placement of the fabric components and the timing slices can be used to perform the physical design of the interconnect area to achieve congestion and timing clean result while minimizing the number of PD iterations. Thus, the congestion aware placement of the fabric components with the objective of minimizing the TWL cost functions can improve routability of the design, and reduce the number of timing slices inserted in the design, which can reduce the overall power consumption. Furthermore, the number of buffers inserted in the backend flow can be reduced which can help reduce the overall cell count.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example floorplan 100 for an integrated circuit (IC) device. The IC device can be an SoC comprising a plurality of on-chip components, which may be implemented using a combination of Intellectual Property (IP) blocks, hard macros, standard cells, or custom cells, among other examples.

The on-chip components of the SoC may include memory devices, processors, accelerators, DMA engines, PHY devices, I/O devices, etc., which may operate as initiators or targets at different times of operation. An initiator may send a transaction to a target, and the target may receive the transaction from the initiator. The transaction may include data or control signals. The initiators and the targets may communicate via an interconnect 102 using any suitable bus protocol, e.g., AXI, CHI, ACE, etc. As an example, communication based on the AXI protocol can use five channels for write address, write data, write response, read address, and read data, with each channel comprising several signals.

The floorplan 100 in FIG. 1 illustrates example placements for some of the on-chip components of the IC device that are coupled to the interconnect 102. For example, the interconnect 102 may be coupled to a memory 104, a processor 106, and an accelerator 108, among other components that are not shown in FIG. 1 for ease of illustration. The interconnect 102 may include a plurality of ports (represented using "x" in FIG. 1) to provide connectivity between various communication ports of the on-chip components. The plurality of ports may include input ports and output ports which may be used to facilitate communication between various communication ports of the on-chip components comprising initiator ports and target ports.

In some cases, an initial place and route of the IC device can be performed to determine timing and routability of different on-chip components of the IC device, and floorplan information can be generated that includes placement information of the on-chip components and an area to implement the interconnect 102. As shown in FIG. 1, the example shaded area allocated to implement the interconnect 102 may not be uniform and may include notches and narrow channels based on the placement of the on-chip components surrounding the interconnect 102. Thus, the interconnect 102 may have to be implemented to fit in the left-over floorplan space available around or between the on-chip components, which can make the routing challenging. Some systems may include a sparsely connected interconnect, and point-to-point connections between each initiator and corresponding target can be used to achieve high performance. This is further described with reference to FIG. 2.

Figure 2:
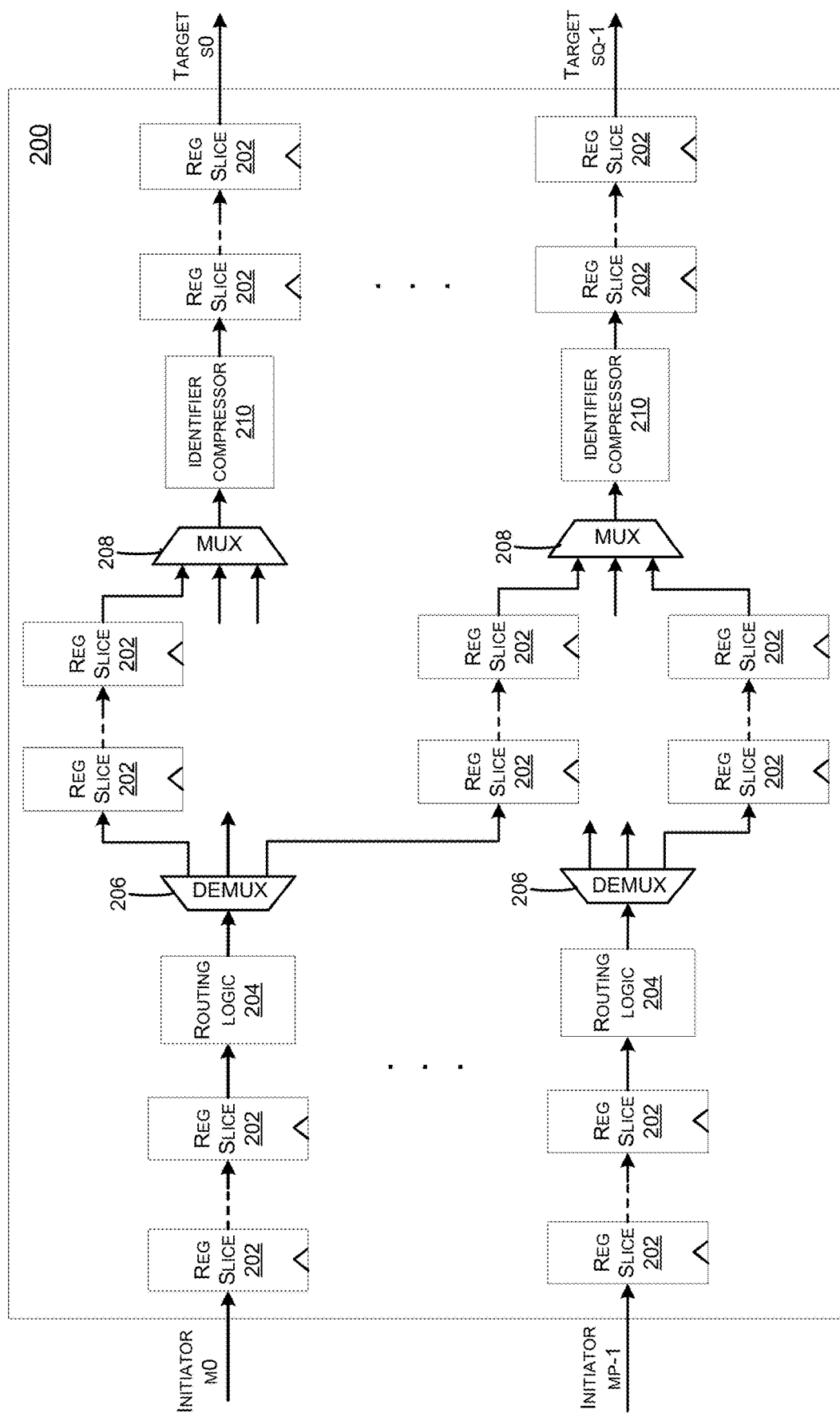
FIG. 2 illustrates an example interconnect comprising a plurality of fabric components to facilitate data transfer between a plurality of initiator ports and target ports associated with various on-chip components of the IC device.

FIG. 2 illustrates an example interconnect 200 comprising a plurality of fabric components to facilitate data transfer between a plurality of initiator ports and target ports associated with various on-chip components of an IC device. The IC device can be an SoC as described with reference to FIG. 1. The plurality of initiator ports and target ports associated with the various on-chip components may operate as initiators or targets at different times of operation. In this specification, the terms "initiator ports" and "initiators" can be used interchangeably, and "target ports" and "targets" can be used interchangeably. In some implementations, the initiators ports and the targets ports may communicate using AXI bus protocol.

In some implementations, the interconnect 200 can be a sparsely connected interconnect, and point-to-point connections between each initiator and corresponding target can be used to achieve high performance. The interconnect 200 may communicate with p number of initiators $m_0, \ldots, m_{p-1}$ via respective p input ports. The interconnect 200 may also communicate with q number of targets $s_0, \ldots, s_{q-1}$ via respective q output ports. Each of the p input ports may be associated with a respective routing logic 204 and a demux 206. Each of the q output ports may be associated with a respective mux 208 and an identifier compressor (IDC) 210. The interconnect 200 may also include a plurality of register (reg) slices 202 between each input port and output port to provide timing slices to traverse the on-chip distance between the input port and output port, and to spread out various fabric components to reduce congestion. The reg slices 202 can be pipelining registers that can hold data between cycles.

The routing logic 204 may include circuitry to keep track of all the transactions that are directed to different targets via the corresponding demux 206. For example, when the data transfer through the interconnect 200 is performed using 5 different channels based on the AXI protocol, the routing logic 204 can be used to store the information associated with the transactions arriving at the demux 206 to maintain correct ordering of the transactions forwarded to different targets in order to avoid deadlocks due to cyclic dependency issues between various channels. In some implementations, the demux 206 and the routing logic 204 can be designed as a hard macro, which can be instantiated for each of the p input ports.

In some implementations that use AXI based interconnect, each mux 208 may append an identifier (ID) bit to each signal that goes through the mux to map the transaction to the initiator port or prior mux. When a large number of signals are merged through a mux, the number of ID bits may increase. The IDC 210 can be used after the mux 208 to map a higher number of ID bits to a smaller number of ID bits with an ID width that is compatible with the corresponding target port.

In some implementations, connectivity between each output port of an interconnect that receives communication from multiple input ports can be implemented using a set of 2:1 muxes based on a hierarchical multiplexing scheme. As an example, the hierarchical multiplexing scheme may use agglomerative clustering based on a distance similarity metric of the multiple input ports to determine which two inputs are provided to each 2:1 mux in the set of 2:1 muxes. The distance similarity metric can be a Manhattan distance. A hierarchical mux for each output port can be built using a dendrogram generated from the agglomerative clustering method. Thus, the number of wires going to the respective target port in each level of hierarchy can be reduced using hierarchical multiplexing, which can reduce routing congestion. This is further described with reference to FIG. 3.

Figure 3:
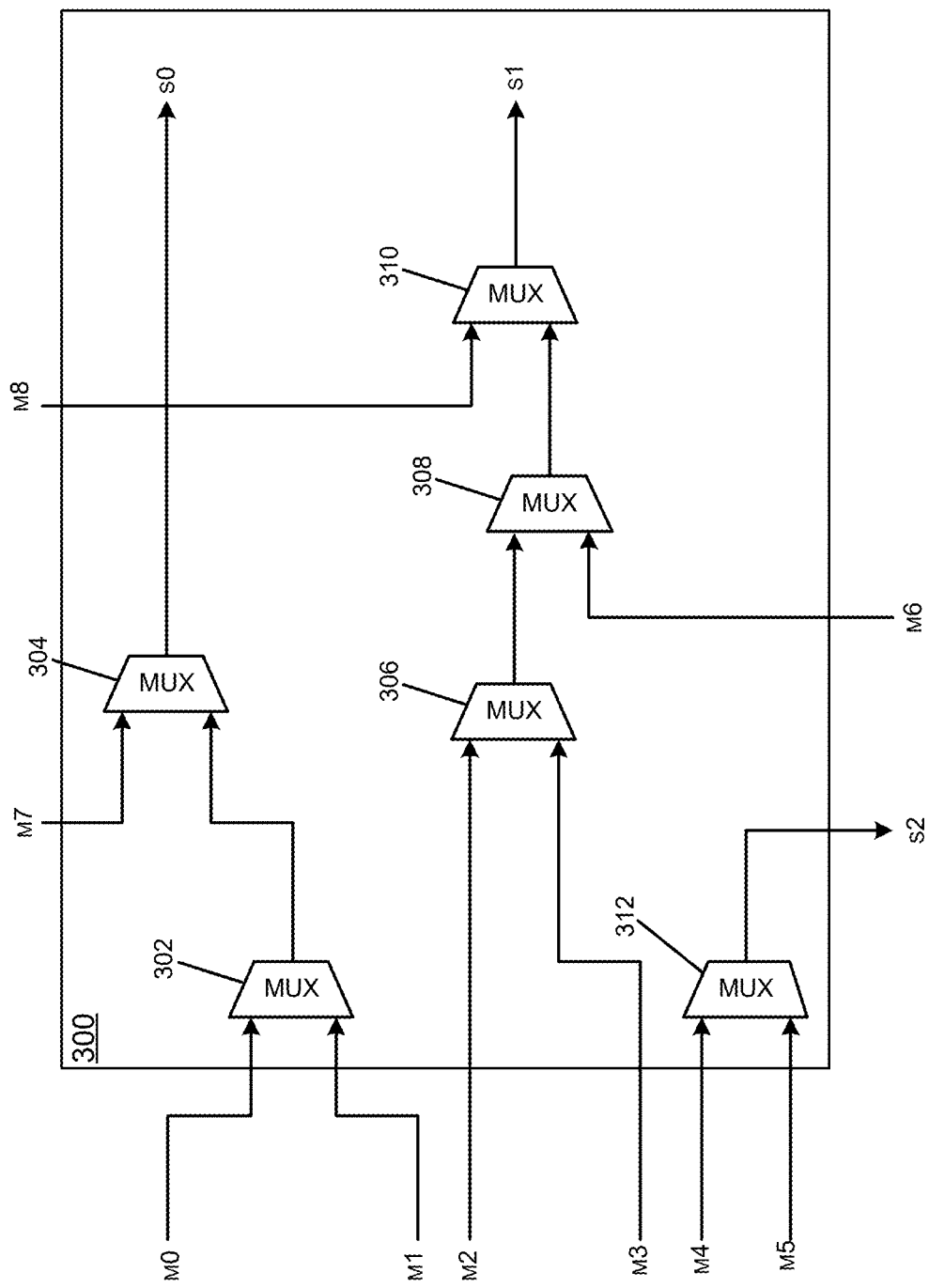
FIG. 3 illustrates an example of an interconnect comprising a set of 2:1 muxes to provide connectivity between the plurality of initiator ports and target ports.

FIG. 3 illustrates an example of an interconnect 300 comprising a set of 2:1 muxes to provide connectivity between the plurality of initiator ports and target ports associated with the on-chip components of an IC device. In some examples, the interconnect 300 may be a subset of the interconnect 200, which can be implemented using the agglomerative clustering method based on the Manhattan distance.

The interconnect 300 may include a first hierarchical mux tree comprising a mux 302 and a mux 304 to provide connectivity between initiator ports m0, m1, and m7, and a target port s0. The interconnect 300 may also include a second hierarchical mux tree comprising a mux 306, a mux 308, and a mux 310 to provide connectivity between initiator ports m2, m3, m6, and m8, and a target port s1. The interconnect 300 may also include a 2:1 mux 312 to provide connectivity between initiator ports m4 and m5, and a target port s2. The first hierarchical mux tree may be built using a dendrogram constructed through agglomerative clustering of physical locations of the initiator ports m0, m1, and m7 included in the floorplan information. Similarly, the second hierarchical mux tree may be built using a dendrogram constructed through agglomerative clustering of physical locations of the initiator ports m2, m3, m6, and m8 included in the floorplan information.

In this example, several timing slices may need to be inserted on pathways between the initiator ports m0-m8, the muxes 302-310, and the target port s0-s2 to traverse the distance between each other depending on the floorplan and the locations of the muxes 302-310. In some cases, the physical design of the interconnect 300 can be performed with the 2:1 muxes as hard macros. However, without the information of where the backend tools may localize the mux logic, it may not be possible to insert the timing slices needed for a timing clean design. In most cases, the physical design iterations to produce a timing clean solution for an interconnect having a large number of 2:1 muxes (e.g., over 100) that connect multiple initiators and targets can be highly inefficient.

As an example, a 1 GHz AXI3 interconnect fabric with 197 initiators and 89 targets, and 5 nm process node can include a total of 746 nets (or signals), where each initiator and target is AXI3 compliant with data signal width of 32 bytes. When a fabric connectivity matrix of this interconnect is expressed as a simple bigraph, the degree of initiator nodes is 1 and the degree of target nodes is 3 on an average indicating that a given target is connected to multiple initiators. The number of 2:1 fabric mux components required to build the physically aware hierarchical mux trees is 108, where each 2:1 mux is an AXI3 fabric mux. Given the large design size, the PD iterations to produce a timing clean solution can be largely inefficient. Note that the interconnect fabric can also include other fabric components in addition to the 2:1 muxes, however, for ease of discussion, some embodiments may be described using only the fabric muxes.

Figure 4:
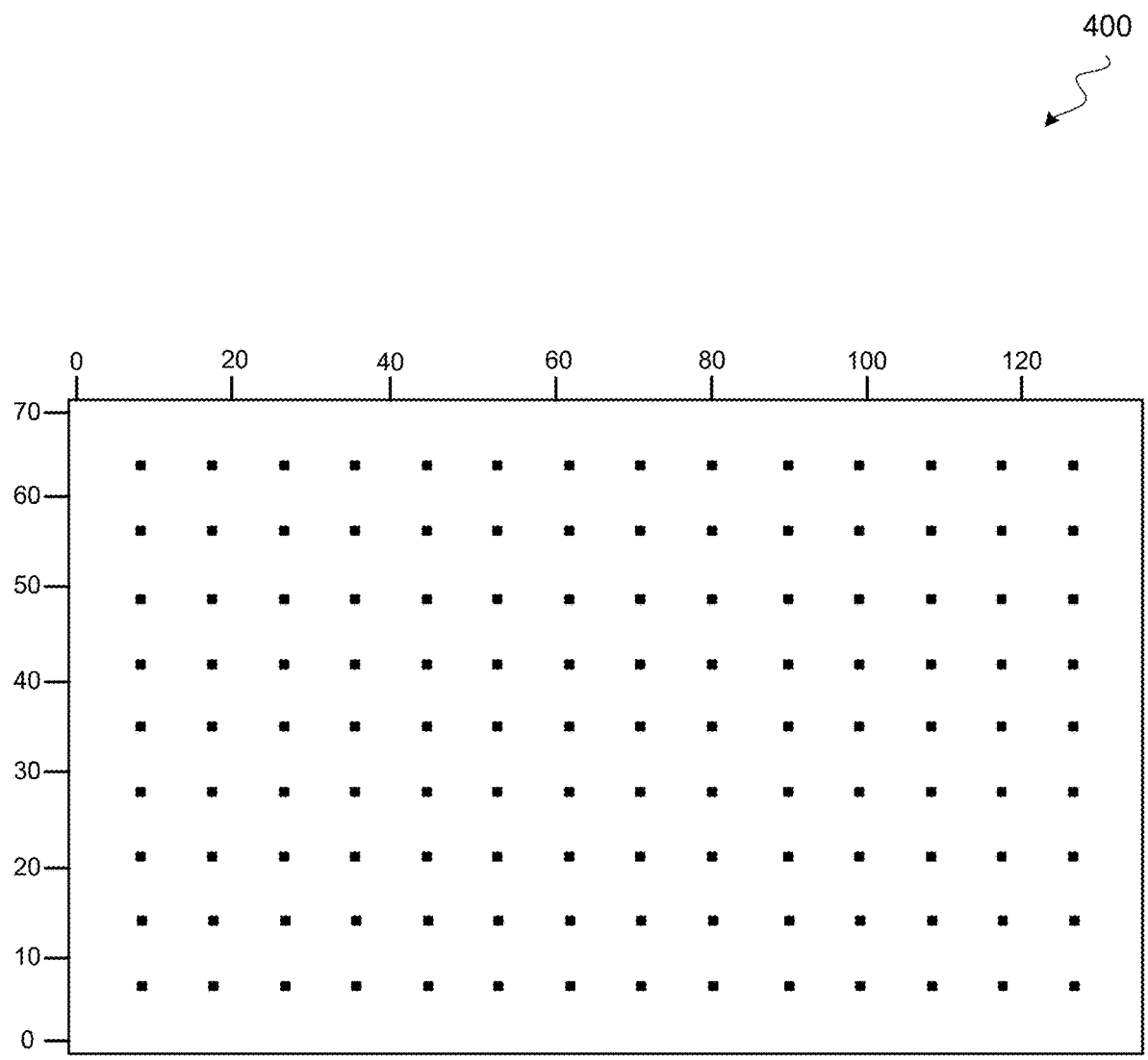
FIG. 4 illustrates an example of a virtual grid that can be used for the congestion aware placement of the fabric components of an interconnect, according to some embodiments.

FIG. 4 illustrates an example of a virtual grid 400 that can be used for the congestion aware placement of the fabric components of an interconnect, according to some embodiments. In various examples, the virtual grid 400 can be used for the placement of the fabric components of the interconnect 102 in FIG. 1, the interconnect 200 in FIG. 2, or the interconnect 300 in FIG. 3.

The virtual grid 400 may include a plurality of grid points that are arranged in rows and columns to fit within the given interconnect area. In most implementations, the interconnect has homogeneous components (e.g., all the mux circuits can have similar cell count and area), and, therefore, the spacing between the grid points can be uniform. For example, legal locations of the virtual grid 400 for the placement of the fabric components be represented by a set $L=\{l_0, l_1, \ldots, l_{lc-1}\}$, where lc is the total number of legal locations. The spacing between two grid points may be dependent on several factors such as size of the fabric components, number of fabric components, fabric connectivity matrix, etc., hence, can vary based on the design implementation and specification.

The number of grid points in the virtual grid 400 can be more than the number of fabric components to allow for movement of the fabric components for optimal placement. However, having a much higher number of grid points than the total number of the fabric components can cause clustering of fabric components in one region on the grid. For example, the number of grid points can be greater than the number of fabric components but less than one-and-a-quarter times of the total number of fabric components. Additionally, the grid points have to be located away from the edges of the interconnect to avoid congestion near the input and output ports of the interconnect.

In the example shown in FIG. 4, the virtual grid 400 can include 126 grid points arranged in 9 rows along x-axis and 14 columns along y-axis, which represent legal locations for placement of the 108 fabric muxes described in the previous example. In some implementations, the location of each grid point in the virtual grid 400 can be represented using x and y coordinates. The interconnect area can be scaled by 20 micrometers (μm) to fit 746 pins of a single AXI3 interface, and each grid point can be spaced along the x-axis and along the y-axis by 7 units. For example, the leftmost grid point at the bottom of the virtual grid 400 can be located at [7,7] x and y coordinates, and is separated by its neighboring grid points along the x-axis and the y-axis by 7 units each.

In some embodiments, the floorplan of the interconnect can be projected on to the virtual grid 400 for congestion aware placement of the fabric components. The congestion aware placement can be based on the objective of minimizing the Total Wirelength (TWL). As an example, an interconnect with the initiators $M=\{m_0, m_1, \ldots, m_{p-1}\}$ and the targets $S=\{s_0, s_1, \ldots, s_{q-1}\}$ may include a set of 2:1 mux components represented by a set $C=\{c_0, c_1, \ldots, c_{r-1}\}$, where r is the total number of 2:1 muxes in the design. For example, the interconnect can be the interconnect 200 with p number of initiators and q number of targets, and the larger muxes 208 in the interconnect 200 may be constructed through the agglomerative clustering method described previously.

In some implementations, the AXI3 interface connections between the initiators, targets and the muxes can be represented by a set $N=\{n_0, n_1, \ldots, n_{t-1}\}$, where t is the total number of AXI3 pathways in the interconnect 200. For ease of discussion, to simplify the placement of the fabric muxes, it can be treated as the PD standard cell placement, hence, the set C can be referred as a set of cells, and the set N can be referred as a set of all the nets in the design. The number of signals in each AXI3 interface connection can be represented as weights of the nets $W=\{w_0, w_1, \ldots, w_{t-1}\}$, such that, each net $n_i$ has an associated weight $w_i$.

One way to compute the wirelength of a net $len(n_i)$ is based on computing a half perimeter wirelength (HPWL) of the net. The HPWL of a net is equal to half of the perimeter of the smallest bounding rectangle that encloses all the pins that are connected to the net. It can be computed in linear time, and can be expressed as a simple closed-form function of the coordinates of the pins of the net. The HPWL may give an accurate estimation, for example, for nets connected to 2 or 3 pins, which may be sufficient for point-to-point connections based on the AXI3 pathways. For nets connected to 4 or more pins, other techniques such as rectilinear Steiner minimal tree (RSMT), rectilinear minimum spanning tree (RMST), refined single trunk tree (RST-T), etc., can be used for estimating the wirelength.

The congestion aware mux placement is based on the objective of TWL cost function minimization. The objective cost function to be minimized is a summation of the weighted lengths of the nets expressed as $$TWL = \sum_{i=0}^{t} w_i * HPWL(n_i).$$

The constraints for the function minimization are as below:
1. Cells occupy only legal locations on the grid, i.e., the cell location $loc(c_i)==l_j$, where $l_j \in L$.
2. Cells do not overlap, i.e., $loc(c_x)!=loc(c_y)$, for all cells $c_x, c_y \in C$.

The methodology for placement of the fabric components of an interconnect on a grid based on minimizing the TWL cost function may include steps to:
1. Project the interconnect onto the grid, create the set of cells C, set of nets N with weights W, and legal cell locations L.
2. Randomly initialize the cell locations with legal placement locations in the grid.
3. Repeat until there is no significant TWL improvement:
   i. Perform optimal location swapping for each cell,
   ii. Perform optimal location insertion and stretching for each cell, and
   iii. Compute TWL improvement with the updated cell locations.

Once the fabric components are placed based on the TWL minimization objective, the timing slices can be inserted based on the distance between the ports and the fabric components. In some implementations, Manhattan distance can be used to compute the lengths of AXI connections between the ports and the fabric components. The $X_i$ number of timing slices can be inserted along each AXI connection $n_i$, where $$X_i = \text{ROUND}\left(\frac{len(n_i)}{stride}\right).$$

The value of stride may vary with process node, frequency of operation, timing corner, etc. The ROUND function may round to the nearest integer.

Output cell locations from the placement methodology can provide the positions to be assigned to the fabric components in the floorplan. The floorplan information including the placement of the fabric components and the timing slices can provide a timing clean solution for physical design of the interconnect. The minimization of the wirelength can improve the routability of the design, reduce the number of timing slices inserted, and hence can reduce the power consumption. Additionally, number of buffers inserted in the backend flow can be reduced which can help to keep the cell count in check. This congestion aware placement algorithms based on the TWL minimization objective are described with reference to FIGS. 5A, 5B, and 5C.

Figure 5A:
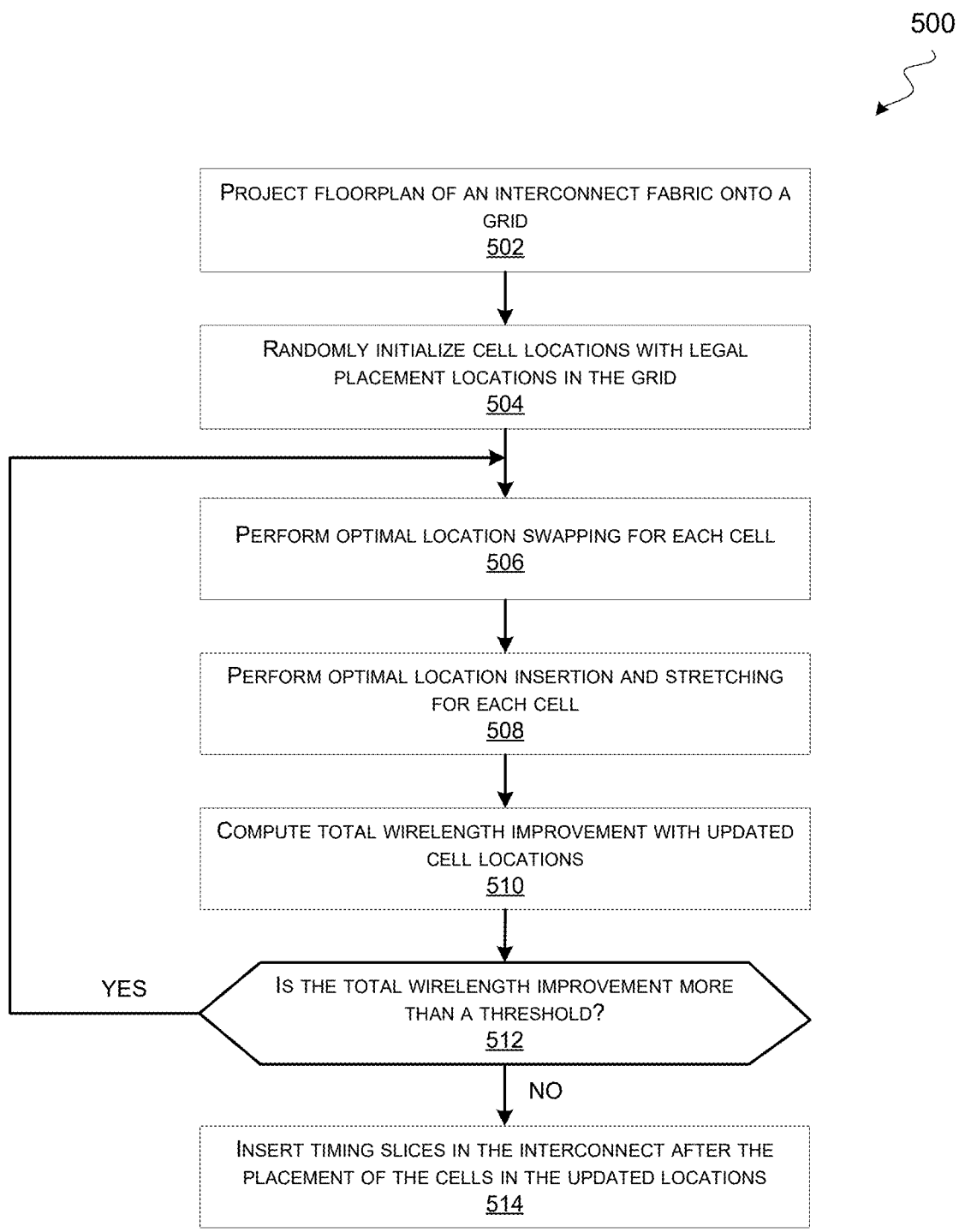
FIG. 5A illustrates an example of a flowchart for a method for congestion aware placement of the fabric components of an interconnect, according to some embodiments.

FIG. 5A illustrates an example of a flowchart 500 for a method for congestion aware placement of the fabric components of an interconnect, according to some embodiments. The interconnect can be part of an IC device (e.g., an SoC) comprising a plurality of on-chip components that communicate via the interconnect using the initiator and target ports. In some examples, the method can be used for the congestion aware placement of the fabric components of the interconnect 100, 200, or 300 described with reference to FIGS. 1, 2, and 3. The congestion aware placement of the fabric components can be thought of as the placement of the standard cells. Thus, herein, a fabric component can be referred to as a "cell", and a connection between the fabric components can be referred to as a "net."

In step 502, the method may include projecting floorplan of an interconnect fabric onto a grid. Projecting the floorplan on the grid may indicate aligning the floorplan with the grid. The floorplan may include information about the area of the interconnect, and the locations of the initiator ports and the target ports. For example, the floorplan may include location information of the initiator ports $m_0, \ldots, m_{p-1}$ and the target ports $s_0, \ldots, s_{g-1}$ of the interconnect 200 in FIG. 2. The floorplan information can be obtained from an initial place and route of the IC device. The placement grid can be the virtual grid 400 comprising a plurality of grid points that represent legal placement locations for the placement of the fabric components in the interconnect 200. In some examples, the muxes 208 in the interconnect 200 may be implemented using a set of hierarchical muxes based on an agglomerative clustering method as described with reference to FIG. 3.

In step 504, the method may include randomly initializing cell locations with legal placement locations in the grid. For example, the location of each fabric component can be initialized with a location of one of the grid points of the virtual grid 400 in a random or a pseudo-random manner such that there is no overlap of multiple fabric components on the same grid point.

In step 506, the method may include performing optimal location swapping for each cell to swap an initial location of a given cell with an optimal location for that cell in the grid. If the locations of all the cells in the floorplan are fixed, then an optimal location of a given cell $c_i$ can be defined as the region to place the cell such that the HPWL of all the nets connecting the cell $c_i$ to other cells is optimal. If the cell $c_i$ is connected to cells $\{c_{i0}, c_{i1}, \ldots\}$ in the interconnect, a location of the cell $c_i$ on the grid can be calculated as a median of x and y coordinates of the locations of the cells $\{c_{i0}, c_{i1}, \ldots\}$. This is described in detail with reference to FIG. 5B.

Figure 5B:
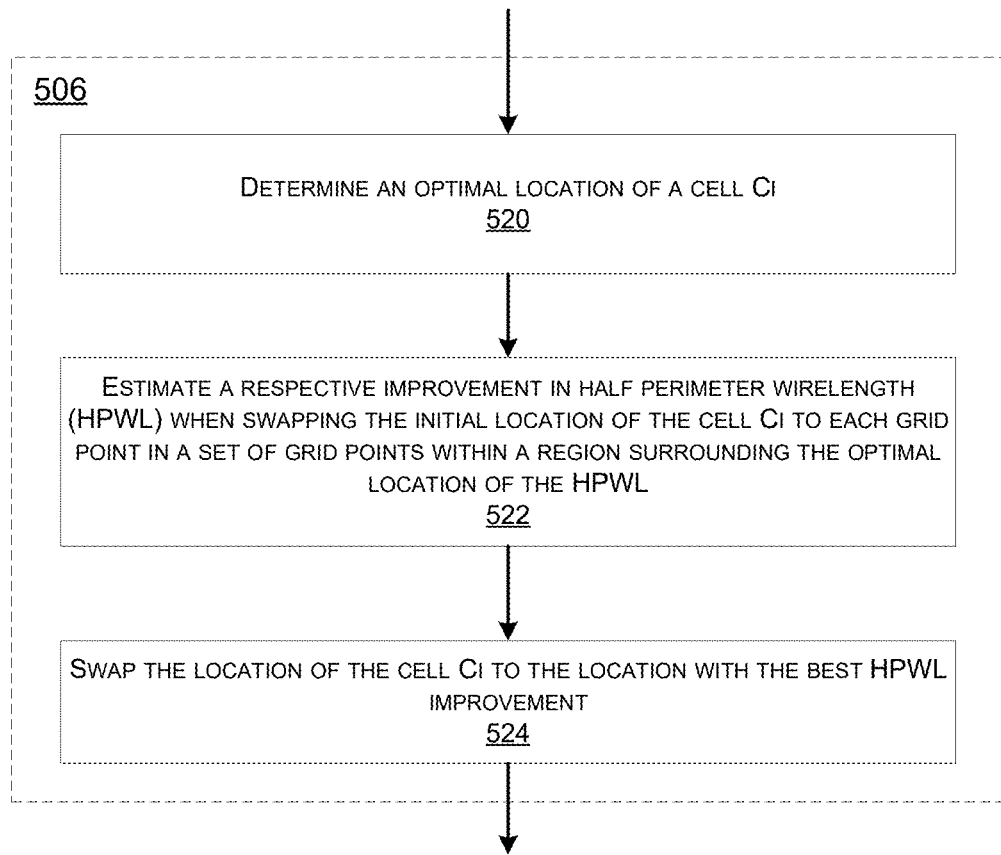
FIG. 5B illustrates an example of a flowchart for a method to perform the optimal location swapping operation for the congestion aware placement, according to some embodiments.

FIG. 5B illustrates an example of a flowchart for a method to perform the optimal location swapping operation described in the step 506 in FIG. 5A for the congestion aware placement, according to some embodiments.

In step 520, the method includes determining an optimal location of the cell $c_i$. In some embodiments, an optimal location for a fabric component on the virtual grid 400 can be determined that has an optimal HPWL of connections to the given fabric component. This is further described with reference to FIG. 6.

Figure 6:
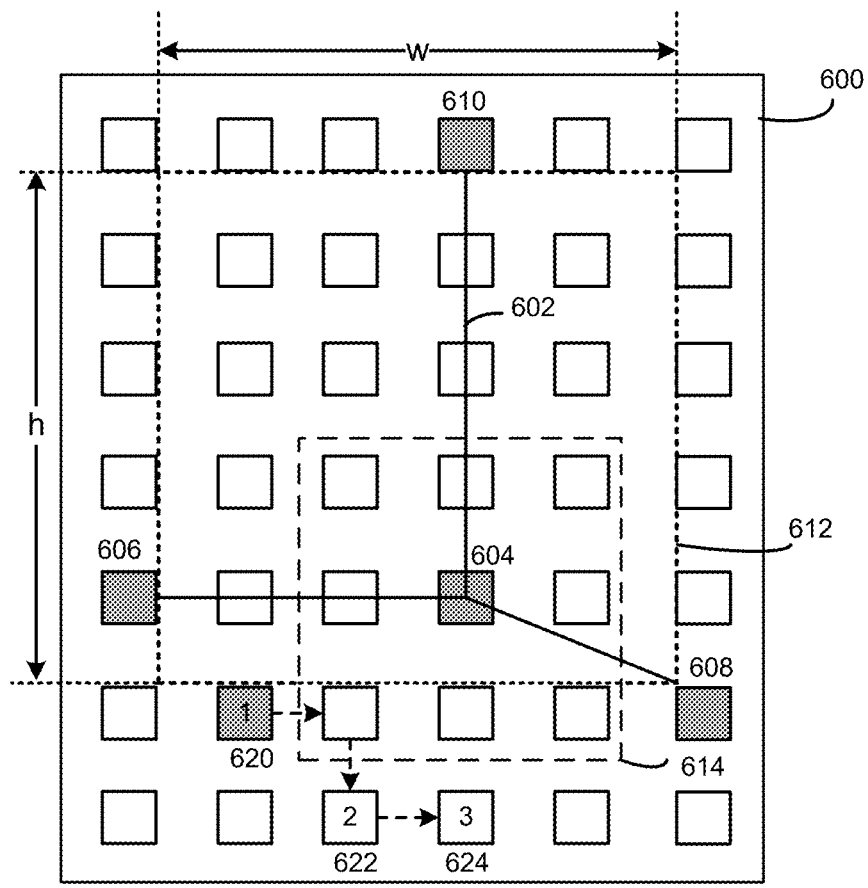
FIG. 6 illustrates an example grid that can be used to describe certain operations for the method to perform the congestion aware placement, according to some embodiments.

FIG. 6 illustrates an example grid 600 that can be used to describe certain operations for the method to perform the congestion aware placement, according to some embodiments. The example grid 600 can be a subset of the virtual grid 400.

As shown in FIG. 6, a pin of a fabric component 604 may be connected to pins of fabric components 606, 608, and 610 via a net 602. As an example, the fabric components 604, 606, 608, and 610 can be multiplexer circuits in the interconnect 200. A bounding box 612 that encloses the pins of the fabric components 606, 608, and 610 may be "w" units wide and "h" units long. The perimeter of the bounding box 612 can be 2×("w"+"h"). Thus, the HPWL of the net 602 connecting the fabric components 604, 606, 608, and 610 can be approximated to half the perimeter of the bounding box 612, which is "w"+"h."

An optimal location for the fabric component 604 can be determined by calculating an optimal HPWL of connections of the fabric component 604 with the fabric components 606, 608, and 610. The location of the fabric component 604 on the grid 600 can be calculated as a median of the x and y coordinates of the locations of the fabric components 606, 608, and 610.

Referring back to FIG. 5B, in step 522, the method further includes estimating a respective improvement in the HPWL when swapping the initial location of the cell $c_i$. to each grid point in a set of grid points within a region surrounding the optimal location of the HPWL. An example region around the optimal location of the fabric component 604 is shown as a dotted box 614 in FIG. 6. The location of the fabric component 604 can be swapped with each of the 8 adjacent locations within the region 614, one-at-a-time, and the respective improvement in the HPWL can be calculated for each swap. The region 614 can be any subset of the virtual grid 400 that surrounds the fabric component 604, or can be same as the virtual grid 400. In some examples, the size of the region 614 can be varied to identify a suitable size of the region 614 that provides the best respective improvement in the HPWL.

Referring back to FIG. 5B, in step 524, the method further includes swapping the location of the cell $c_i$. to the location with the best HPWL improvement. The location of the fabric component 604 can be swapped with another grid point in the region 614 that has the highest HPWL improvement.

Referring back to FIG. 5A, in step 508, subsequent to performing the location swapping operation for each cell, the method may further include performing optimal location insertion and stretching for each cell to further update the location of the cell. Performing the optimal location insertion and stretching for each cell $c_i$ may include calculating an optimal location $l_i$ for the insertion of cell $c_i$. If there is no pre-existing cell $c_j$ in the location $l_i$, the new location of the cell $c_i$ can be $l_i$. If there is an overlap with a pre-existing cell $c_j$ at the location $l_i$, then the cells can be pushed in the direction of nearest empty location. The HPWL for all the cells whose locations have changed can be computed, and the cell locations can be updated for the cells that have improvement in the HPWL. This is described using FIG. 5C.

Figure 5C:
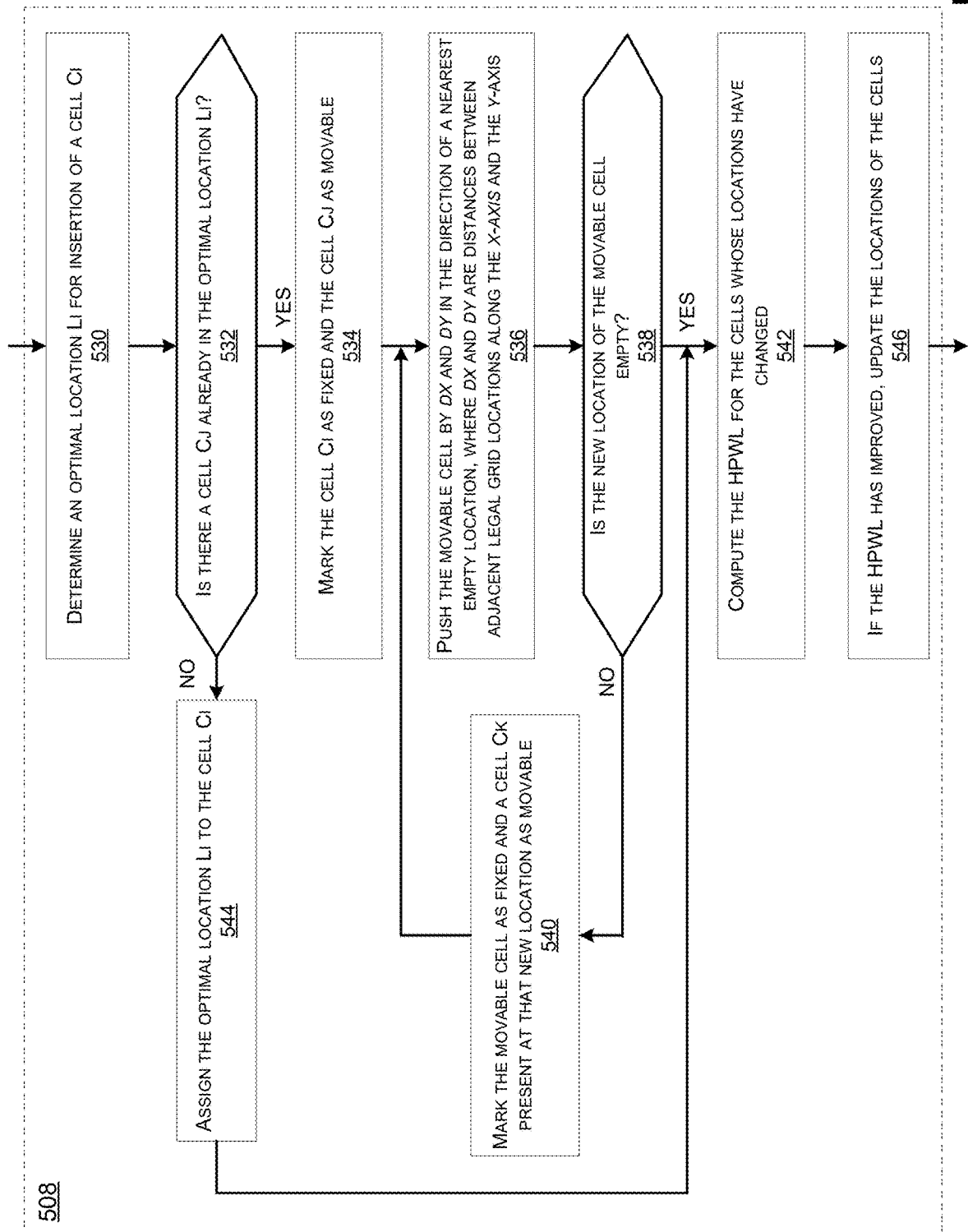
FIG. 5C illustrates an example of a flowchart for a method to perform the optimal location insertion and stretching operation for the congestion aware placement, according to some embodiments.

FIG. 5C illustrates an example of a flowchart for a method to perform the optimal location insertion and stretching operation described in the step 508 in FIG. 5C for the congestion aware placement, according to some embodiments.

In step 530, the method may include determining an optimal location $l_i$ for insertion of a cell $c_i$. For example, an optimal location for a fabric component 620 in the example grid 600 can be determined as described with reference to the step 520 in FIG. 5B. As an example, the optimal location $l_i$ for the insertion of the fabric component 620 can be a location 1 in the grid 600.

In step 532, the method may further include determining whether there is a pre-existing cell $c_j$ already in the location $l_i$ for inserting the cell $c_i$. The method may determine if there is another fabric component at the location 1, where the fabric component 620 is to be inserted.

In step 544, upon determining that there is no pre-existing cell $c_j$ already in the location $l_i$ for inserting the cell $c_i$, the method may further include assigning the optimal location $l_i$ to the cell $c_i$. For example, the location 1 may be assigned to the fabric component 620 upon determining that there is no fabric component already at the location 1 in the grid 600. In step 534, upon determining that there is a cell $c_j$ already at the location $l_i$, the method may further include marking the cell $c_i$ as fixed at the location $l_i$, and the cell $c_j$ movable. For example, if a fabric component 622 is already at the location 1, the fabric component 620 can be marked as fixed at the location 1, and the fabric component 622 can be marked movable.

In step 536, the method may further include pushing the movable cell by dx and dy in the direction of a nearest empty location, where dx and dy are distances between adjacent legal grid locations along the x-axis and the y axis. As shown in FIG. 6, the fabric component 622 can be pushed to an adjacent grid point along the x-axis and the y-axis to an empty location 2. In some embodiments, the nearest empty location can be computed using Manhattan distance.

In step 538, the method may further include determining whether the new location of the movable cell is empty. For example, the method may further determine whether the location 2 where the fabric component 622 is to be moved in the grid 600 is empty.

In step 540, upon determining that the new location of the movable cell is not empty, the method may further include marking the movable cell as fixed and a cell ck at that new location as movable. As shown in FIG. 6, if there is a fabric component 624 already at the location 2, then the fabric component 622 can be marked fixed at the location 2, and the fabric component 624 can be marked movable. The fabric component 624 can be pushed in the direction of a nearest empty location 3 in the step 536, and can be marked fixed at the location 3 in the step 538, if the location 3 is empty.

In step 542, upon determining that the new location of the movable cell is empty, the method may further include computing the HPWL for the cells whose locations have changed. For example, the method may include computing the HPWL for the fabric components 622 and 624 whose locations have changed to the locations 2 and 3.

In step 546, the method may further include updating the locations of the cells if the HPWL has improved. If the HPWL for the fabric components 622 and 624 have improved, then the locations of the fabric components 622 and 624 can be updated to the locations 2 and 3, respectively. Note that each of the locations 1, 2, and 3 can be represented using x and y coordinates with respect to the virtual grid 400.

Referring back to FIG. 5A, in step 510, upon performing the optimal location insertion and stretching for each cell, the method may further include computing TWL improvement with the updated cell locations. The improvement in the TWL with updated locations for each fabric component can be computed.

In step 512, the method may include determining whether the TWL is more than a threshold. If the TWL improvement is more than the threshold, the method may transition to the step 506, and the steps 506, 508, 510, and 512 can be repeated until the TWL is less than the threshold indicating that the improvement in the TWL is not significant enough.

In step 514, upon determining that the TWL improvement is less than the threshold, the method may further include inserting timing slices in the interconnect after the placement of the cells in the updated locations. For example, the updated locations of the fabric components computed using the steps 506, 508, 510, and 512 can provide the positions of the fabric components in the floorplan. In some embodiments, Manhattan distance can be used to compute the lengths of the connections between the interconnect ports and the fabric components. The timing slices can be inserted along each connection based on a stride. The stride can vary based on the process node, frequency of operation, timing corners, etc. As an example, the stride for the interconnect with the 108 muxes can be set to 700 um for 1 GHz AXI3 fabric with 5 nm process node.

This methodology described with reference to FIGS. 5A, 5B, and 5C can provide a congestion and timing clean result without many PD iterations. For the example interconnect 200 with 197 initiators and 89 targets, as described with reference to the virtual grid 400, locations of the 108 2:1 muxes can be computed using the above methodology, and is shown in FIG. 7A.

Figure 7A:
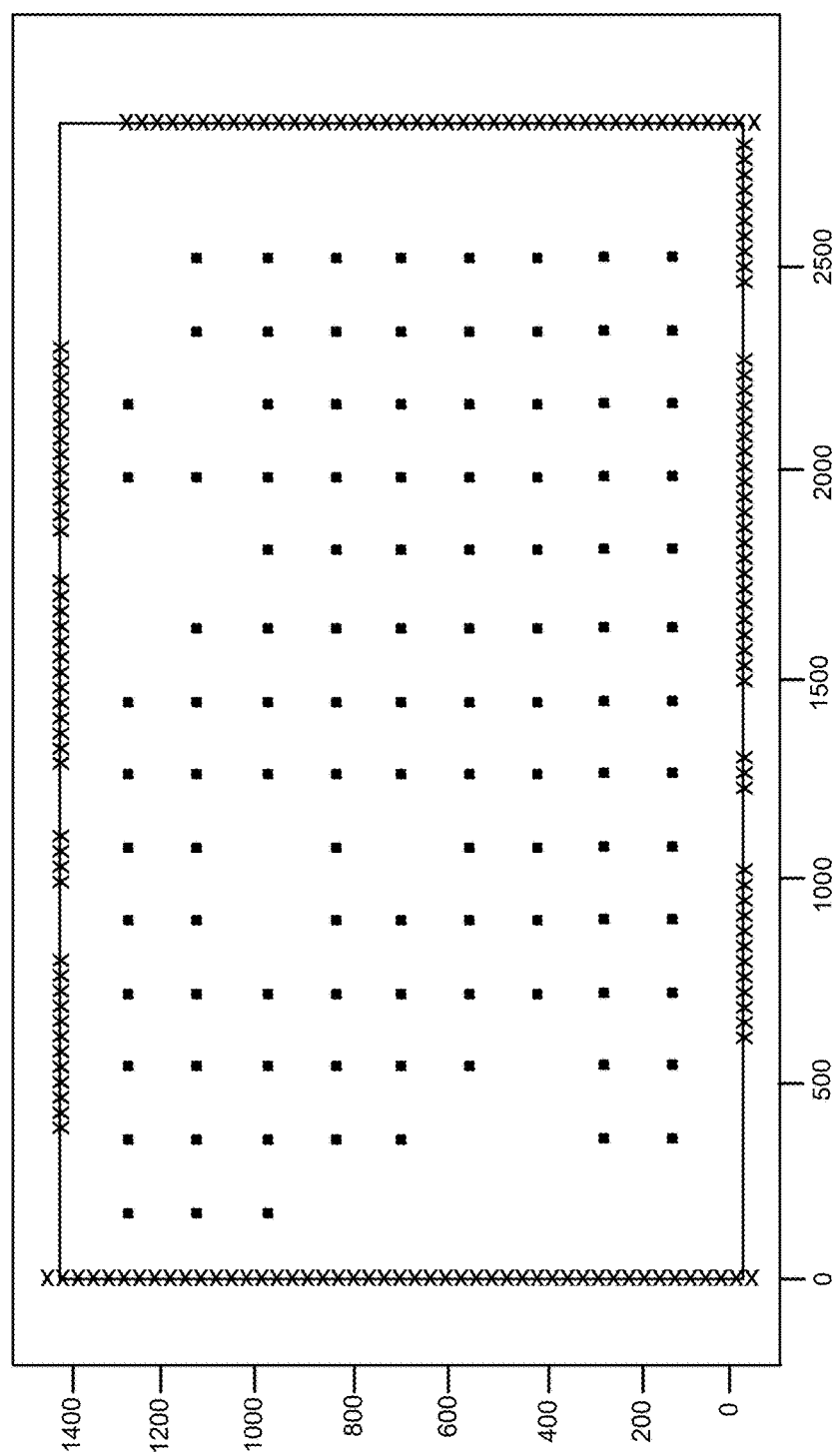
FIG. 7A illustrates an example of the congestion aware placement of a set of 2:1 muxes on the virtual grid, according to some embodiments.

FIG. 7A illustrates an example 700A of the congestion aware placement of the 108 2:1 muxes on the virtual grid 400, according to some embodiments.

As shown in FIG. 7A, each of the 108 2:1 muxes may be placed on one of the grid points on the virtual grid 400, and some of the grid points may not be used. The muxes are surrounded by the initiator and target ports represented using "x" in FIG. 7A. Note that some of the heterogenous fabric components (e.g., demuxes 206) may occupy more than one grid point during the placement on the virtual grid 400, which needs to be considered during the optimal location swapping, and the optimal location insertion and stretching operations.

Thus, the methodology described above can be used to provide a congestion and timing clean result for 1 GHz AXI3 compliant interconnect with 197 initiators and 89 targets without much PD iterations. Each AXI3 interface has data signal width of 32 bytes and a total of 746 signals in the AXI3 interface comprising of 5 AXI channels. The design has a total of 108 2×1 muxes whose location is obtained by the mux placement methodology, as shown in the FIG. 7A. The locations obtained are used as centroids of bounding boxes to loosely localize mux logic in the PD. The post route result and the standard cell distribution obtained from the PD of the interconnect 200 are shown in FIGS. 7B, and 7C.

Figure 7B:
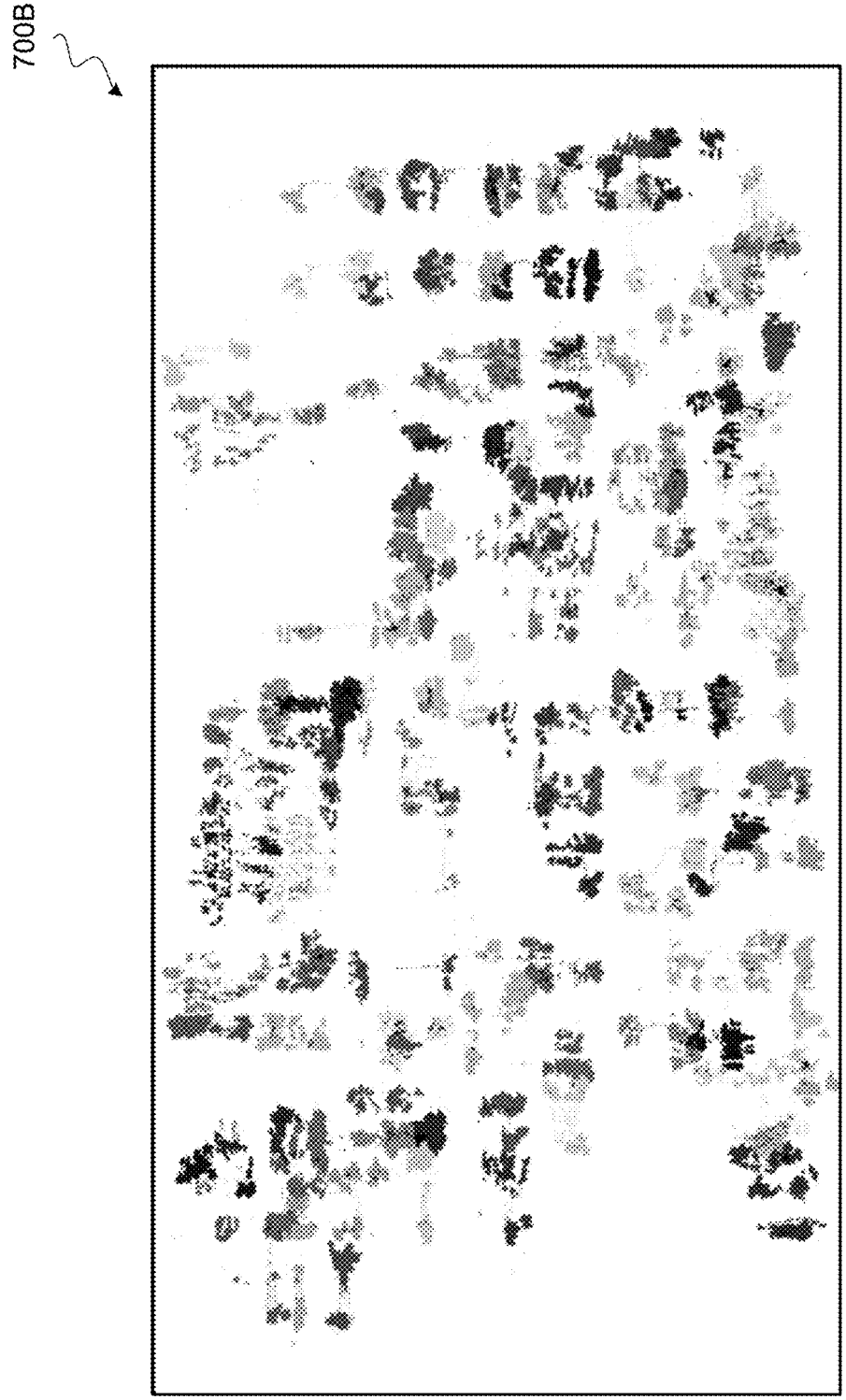
FIG. 7B illustrates an example of a post-route view of the interconnect with the set of 2:1 muxes, according to some embodiments.
Figure 7C:
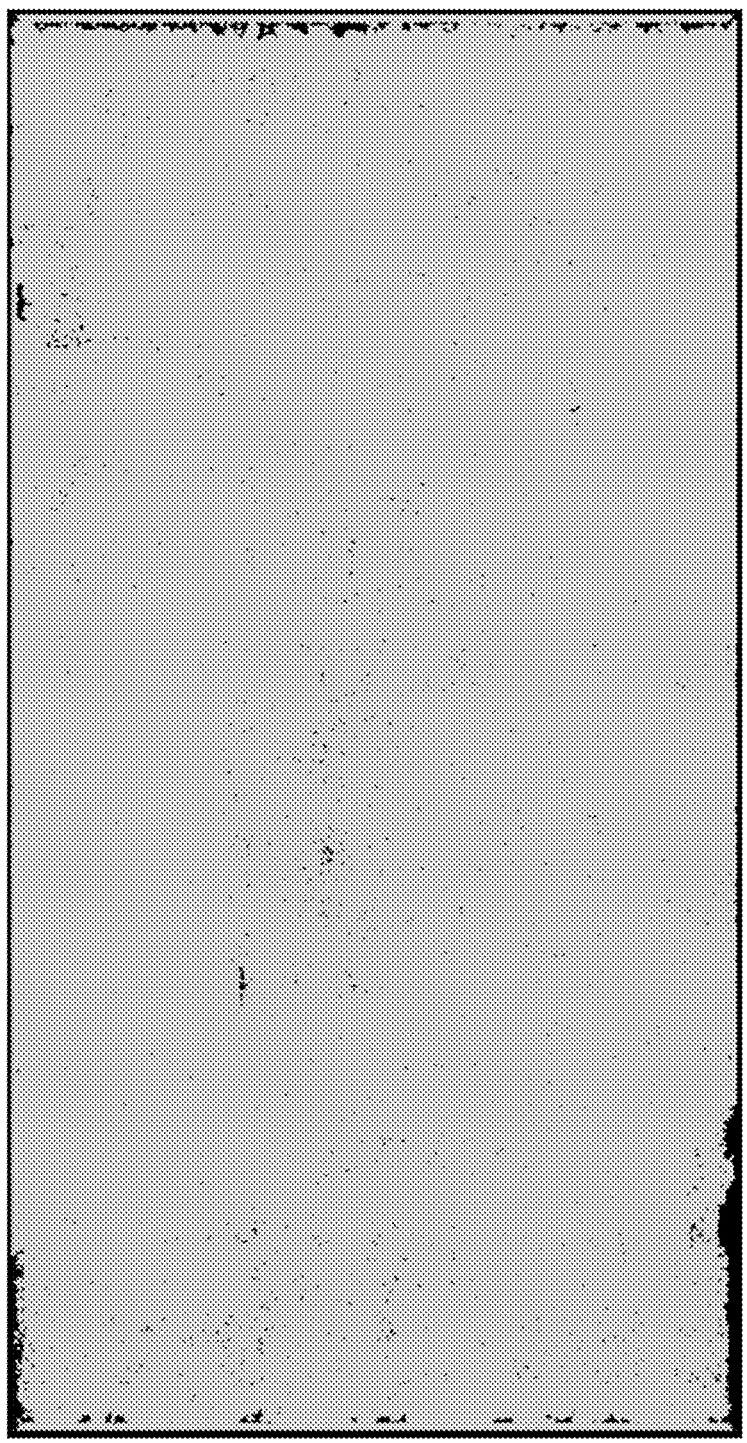
FIG. 7C illustrates an example of a standard cell distribution for the interconnect, according to some embodiments.

An example of a PD post route result 700B in FIG. 7B shows the mux logic being localized around the same locations that have been assigned using the methodology, as shown in FIG. 7A. An example of a standard cell distribution 700C for the interconnect 200 is shown in FIG. 7C that includes 108 muxes, timing slices, buffers, and input/output ports, and has negligible congestion overflow. Thus, the design congestion map and the standard cell distribution have achieved uniform spread of logic, which is an important factor in resolving congestion.

Figure 8:
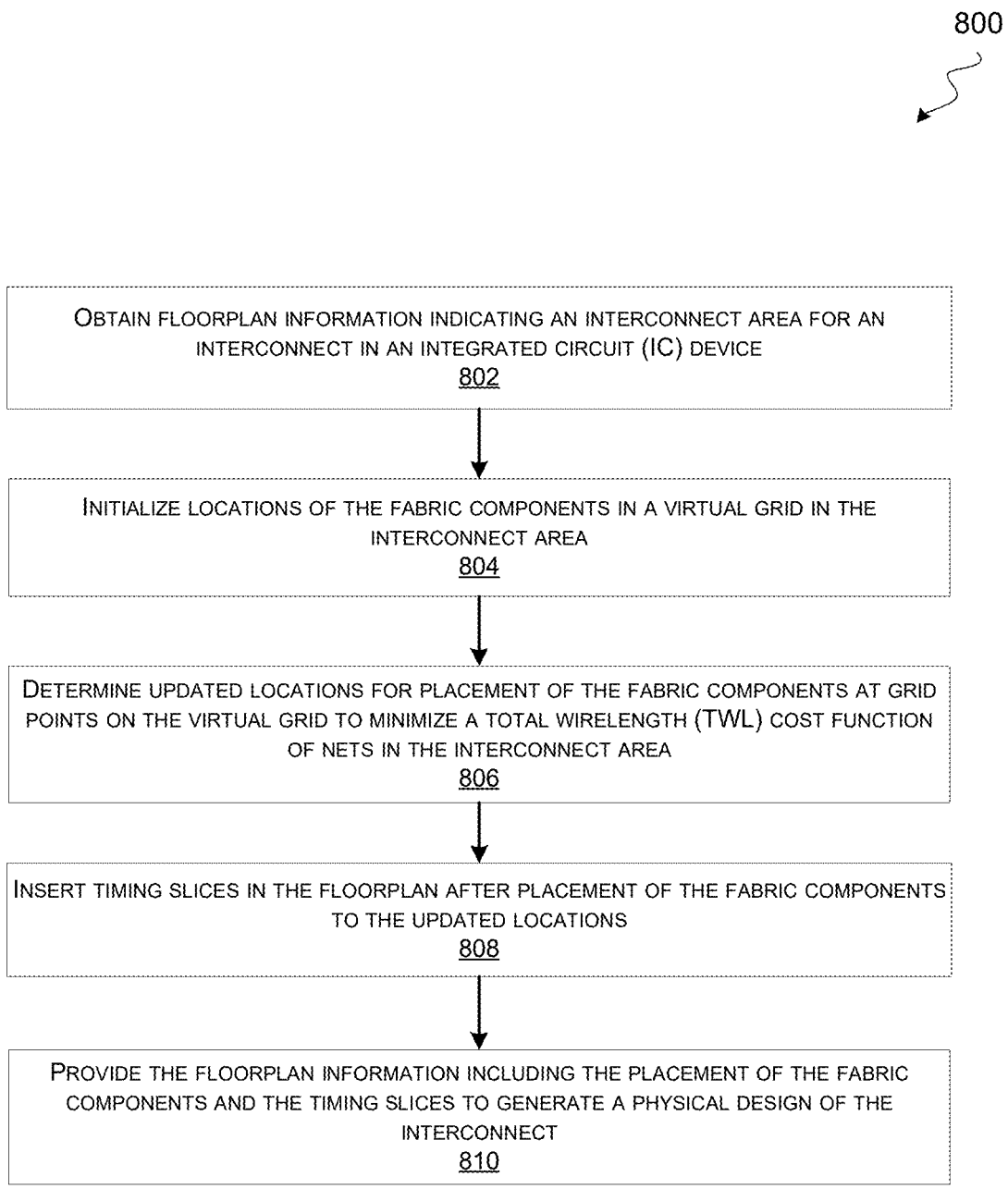
FIG. 8 shows an example flowchart for a method that can be executed for congestion aware placement of the fabric components of an interconnect in an IC device, according to some embodiments.

FIG. 8 shows an example flowchart 800 for a method that can be executed for congestion aware placement of the fabric components of an interconnect in an IC device, according to some embodiments. The IC device can be an SoC comprising a plurality of on-chip components, as described with reference to FIG. 1. The interconnect can be the interconnect 100, 200, or 300.

In step 802, the method includes obtaining floorplan information indicating an interconnect area for an interconnect in an IC device. As an example, the floorplan information may include the location of each of the p initiator ports and the q target ports, and an area of the interconnect 102. The floorplan information may be provided by an initial place and route of the SoC.

In step 804, the method may include initializing locations of fabric components in a virtual grid in the interconnect area. For example, the locations of the fabric components can be initialized in the virtual grid 400 with the legal placement locations represented by the grid points of the virtual grid 400. The virtual grid 400 can be a uniform grid with even spacing between the grid points, and the number of grid points on the virtual grid 400 can be slightly more than a number of the fabric components in the interconnect 200. In some examples, the fabric components include 108 2:1 muxes, and the virtual grid 400 includes 126 grid points indicating 126 legal placement locations for the 108 muxes.

In step 806, the method includes determining updated locations for placement of the fabric components at grid points on the virtual grid to minimize a TWL cost function of nets in the interconnect area. Determining the updated locations for the placement of the fabric components on the virtual grid may include, for each fabric component, performing a location swapping operation to swap an initial location of the fabric component with another location in the virtual grid. Performing the location swap operation may include determining a location on the virtual grid for a given fabric component that has an optimal HPWL of connections to the given fabric component. Performing the location swap operation may further include determining a respective improvement in the HPWL when swapping the initial location of the given fabric component to each grid point in a set of grid points within a region surrounding the location of the HPWL, and swapping the location of the given fabric component to a new grid point within the region that has a highest HPWL improvement.

For example, the location swapping operation can be similar to the optimal location swapping operation for each cell described in the step 506 with reference to FIG. 5B, and FIG. 6. The location on the virtual grid for the given fabric component having the optimal HPWL can be a median of x-coordinates and y-coordinates of locations of the fabric components that are connected to the given fabric component. The region surrounding the location of the given fabric component can be a subset of the grid points of the virtual grid, similar to the region 614 in FIG. 6.

Subsequent to performing the location swapping operation for each fabric component, determining the updated locations for the placement of the fabric components on the virtual grid may further include, performing a location insertion and stretching operation to further update the location of the fabric components. Performing the location insertion and stretching operation may include, for each fabric component, determining a location on the virtual grid for placement of a given fabric component that has an optimal HPWL of connections to the given fabric component in the interconnect, and moving the given fabric component to a grid point corresponding to that location. Performing the location insertion and stretching operation further includes upon determining that there is another fabric component at that location, moving the other fabric component to a nearest empty grid point on the virtual grid. Performing the location insertion and stretching operation may further include computing a respective HPWL for each fabric component that has moved to an updated location, and, for each fabric component that has an improvement in the respective HPWL, placing the fabric component at the updated location. Performing the location insertion and stretching operation can be similar to performing the location insertion and stretching operation for each cell described in the step 508 with reference to FIG. 5C, and FIG. 6.

In step 808, the method further includes inserting timing slices in the floorplan after placement of the fabric components to the updated locations. As described with reference to the step 514 in FIG. 5A, timing slices can be inserted along each connection between the initiator ports, target ports, and the fabric components based on a stride. For example, the timing slices can be similar to the reg slices 202 in FIG. 2.

In step 810, the method includes providing the floorplan information including the placement of the fabric components and the timing slices to generate a physical design of the interconnect. The floorplan information including the placement of the fabric components and the timing slices can be used to provide a timing clean design of the interconnect that is PD optimized without going through multiple iterations of design, PD, re-design, and then re-PD. The techniques described herein provide a backend driven RTL design approach to solve timing closure problem, and can be extended to various floorplan shapes, interconnect protocols, process nodes, design frequencies, as well as crossbar implementations permitted by the floorplan size.

In some embodiments, the above-described method can be performed by a software program that can be executed by one or more processors of a computing system. For example, the software program can include instructions stored in a non-transitory computer readable medium that can be executed by the processor(s). The software program can be implemented using any suitable programming language, e.g., Python, C++, Java, etc. In some embodiments, the software program can be part of an electronic design automation (EDA) tool, or a place-and-route tool.

Figure 9:
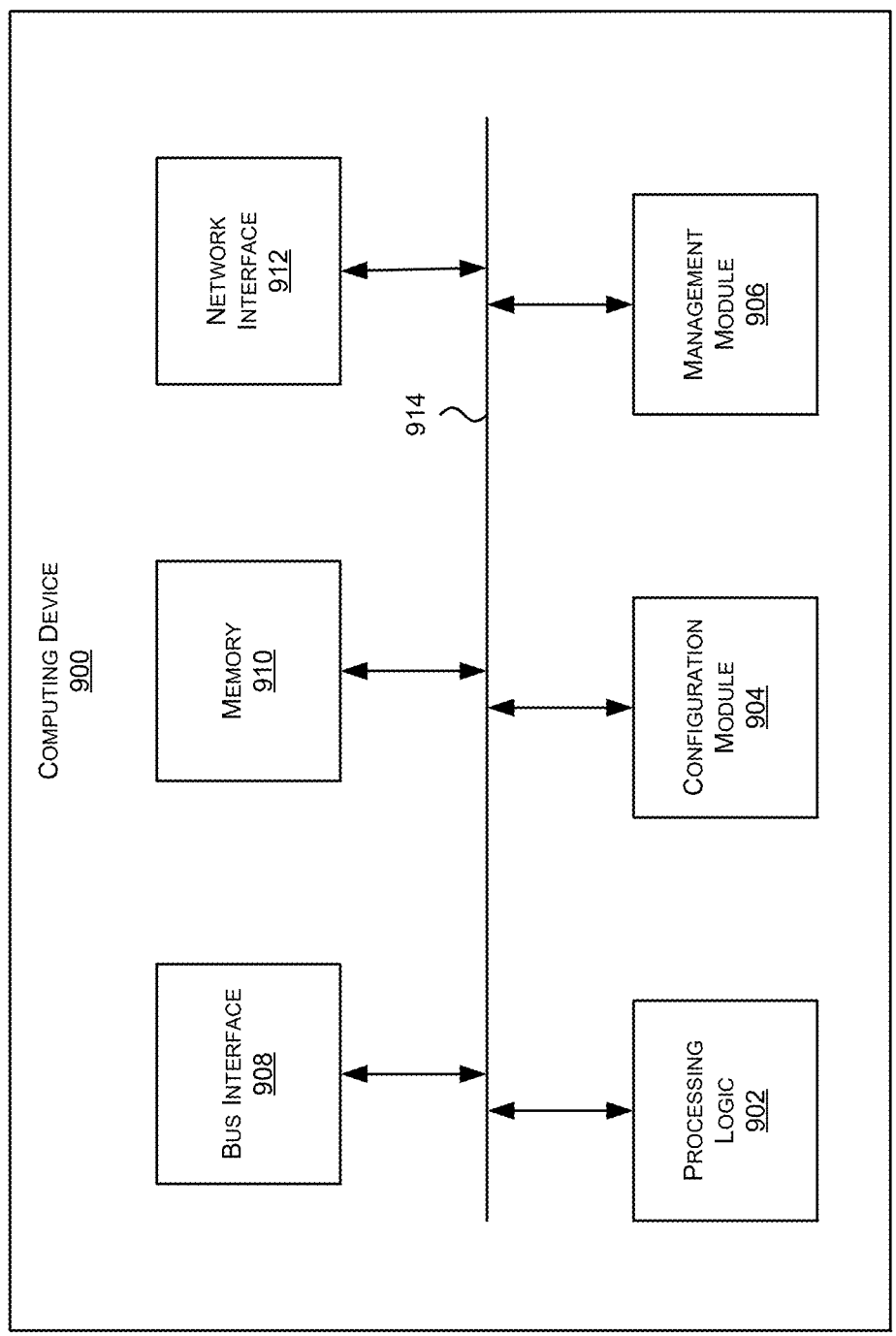
FIG. 9 illustrates an example of a computing device, according to certain aspects of the disclosure.

FIG. 9 illustrates an example of a computing device 900. Functionality and/or several components of the computing device 900 may be used without limitation with other embodiments disclosed elsewhere in this disclosure, without limitations. For example, the computing device can be an example of the IC device or the SoC described with reference to the previous figures. A computing device 900 may facilitate processing of packets and/or forwarding of packets from the computing device 900 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 900 may be the recipient and/or generator of packets. In some implementations, the computing device 900 may modify the contents of the packet before forwarding the packet to another device. The computing device 900 may be a peripheral device coupled to another computer device, a switch, a router or any other suitable device enabled for receiving and forwarding packets.

In one example, the computing device 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The computing device 900 may include additional modules, which are not illustrated here. In some implementations, the computing device 900 may include fewer modules. In some implementations, one or more of the modules may be combined into one module. One or more of the modules may be in communication with each other over a communication channel 914. The communication channel 914 may include one or more busses, meshes, matrices, fabrics, a combination of these communication channels, or some other suitable communication channel.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the computing device 900, while in other cases some or all of the memory may be external to the computing device 900. The memory 910 may store an operating system comprising executable instructions that, when executed by the processing logic 902, provides the execution environment for executing instructions providing networking functionality for the computing device 900. The memory may also store and maintain several data structures and routing tables for facilitating the functionality of the computing device 900.

In some implementations, the configuration module 904 may include one or more configuration registers. Configuration registers may control the operations of the computing device 900. In some implementations, one or more bits in the configuration register can represent certain capabilities of the computing device 900. Configuration registers may be programmed by instructions executing in the processing logic 902, and/or by an external entity, such as a host device, an operating system executing on a host device, and/or a remote device. The configuration module 904 may further include hardware and/or software that control the operations of the computing device 900.

In some implementations, the management module 906 may be configured to manage different components of the computing device 900. In some cases, the management module 906 may configure one or more bits in one or more configuration registers at power up, to enable or disable certain capabilities of the computing device 900. In certain implementations, the management module 906 may use processing resources from the processing logic 902. In other implementations, the management module 906 may have processing logic similar to the processing logic 902, but segmented away or implemented on a different power plane than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the computing device 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 900 may include multiple network interface modules, each configured to communicate with a different network. For example, in these implementations, the computing device 900 may include a network interface module for communicating with a wired Ethernet network, a wireless 802.11 network, a cellular network, an Infiniband network, etc.

The various components and modules of the computing device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, FIG. $$$, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
obtaining a floorplan of an interconnect fabric in a system-on-a-chip (SoC) coupled to on-chip components of the SoC via initiator ports and target ports, the floorplan indicating an area for implementing the interconnect fabric, and placement locations of the initiator ports and the target ports in the floorplan;
projecting the floorplan of the interconnect fabric onto a virtual grid comprising grid points that represent legal placement locations for fabric components of the interconnect fabric;
initializing locations of the fabric components in the floorplan with the legal placement locations in the virtual grid;
determining updated locations for placement of the fabric components on the grid 12 points in the virtual grid that minimize a total wirelength (TWL) cost function of nets in the interconnect fabric by:
for each fabric component:
performing a location swapping operation to swap an initial location of a given fabric component with another location in the virtual grid; and
performing a location insertion and stretching operation to further update the location of the given fabric component;
inserting, based on the placement locations of the initiator ports and the target ports, timing slices in the floorplan after the placement of the fabric components to the updated locations; and
providing the floorplan, including the placement of the fabric components and the timing slices, to generate a physical design of the interconnect fabric.

2. The method of claim 1, wherein performing the location swapping operation includes:
determining a location on the virtual grid for the given fabric component that has an optimal half perimeter wirelength (HPWL) of connections to the given fabric component;

determining a respective improvement in the HPWL when swapping the initial location of the given fabric component to each grid point in a set of grid points within a region surrounding the location of the HPWL; and swapping the location of the given fabric component to a new grid point within the region that has a highest HPWL improvement.

3. The method of claim 1, wherein performing the location insertion and stretching operation includes:

determining a location on the virtual grid for placement of the given fabric component that has an optimal HPWL of connections to the given fabric component;

moving the given fabric component to a grid point corresponding to the determined location;

upon determining that there is another fabric component at the determined location, moving the other fabric component to a nearest empty grid point on the virtual grid;

computing a respective HPWL for each fabric component that has moved to an updated location; and for each fabric component that has an improvement in the respective HPWL, placing the fabric component at the updated location.

4. The method of claim 1, wherein the timing slices include pipelining registers, and the fabric components include multiplexer circuits, demultiplexer circuits, identifier compressor circuits, or routing circuits.

5. A method, comprising:

obtaining floorplan information indicating an interconnect area for an interconnect in an integrated circuit (IC) device;

initializing locations of fabric components of the interconnect in a virtual grid in the interconnect area;

determining updated locations for placement of the fabric components at grid points on the virtual grid to minimize a total wirelength (TWL) cost function of nets in the interconnect area;

inserting timing slices in the floorplan after placement of the fabric components to the updated locations; and providing the floorplan information, including the placement of the fabric components and the timing slices, to generate a physical design of the interconnect.

6. The method of claim 5, wherein determining the updated locations for the placement of the fabric components on the virtual grid includes:

for each fabric component:
performing a location swapping operation to swap an initial location of the fabric component with another location in the virtual grid.

7. The method of claim 6, wherein performing the location swapping operation includes:

determining a location on the virtual grid for a given fabric component that has an optimal half perimeter wirelength (HPWL) of connections to the given fabric component;

determining a respective improvement in the HPWL when swapping the initial location of the given fabric component to each grid point in a set of grid points within a region surrounding the location of the HPWL; and swapping the location of the given fabric component to a new grid point within the region that has a highest HPWL improvement.

8. The method of claim 7, wherein the location on the virtual grid for the given fabric component having the optimal HPWL is a median of x-coordinates and y-coordinates of locations of the fabric components that are connected to the given fabric component.

9. The method of claim 7, wherein the region surrounding the location of the given fabric component is a subset of the grid points of the virtual grid.

10. The method of claim 6, wherein determining the updated locations for the placement of the fabric components on the virtual grid further includes:

subsequent to performing the location swapping operation for each fabric component, performing a location insertion and stretching operation to further update the location of the fabric components.

11. The method of claim 10, wherein performing the location insertion and stretching operation includes:

for each fabric component:
determining a location on the virtual grid for placement of a given fabric component that has an optimal HPWL of connections to the given fabric component in the interconnect; and moving the given fabric component to a grid point corresponding to the determined location.

12. The method of claim 11, wherein performing the location insertion and stretching operation further includes:

upon determining that there is another fabric component at the determined location, moving the other fabric component to a nearest empty grid point on the virtual grid.

13. The method of claim 12, wherein performing the location insertion and stretching operation further includes:

computing a respective HPWL for each fabric component that has moved to an updated location; and for each fabric component that has an improvement in the respective HPWL, placing the fabric component at the updated location.

14. The method of claim 5, wherein a number of grid points on the virtual grid are more than a number of the fabric components in the interconnect.

15. The method of claim 5, wherein the virtual grid is a uniform grid with even spacing between the grid points.

16. The method of claim 5, wherein the timing slices are inserted along each connection based on a stride.

17. A non-transitory computer readable medium having stored therein instructions that, when executed by one or more processors of a computing system, cause the computing system to perform a method comprising:

obtaining floorplan information indicating an interconnect area for an interconnect in an integrated circuit (IC) device;

initializing locations of fabric components of the interconnect in a virtual grid in the interconnect area;

determining updated locations for placement of the fabric components at grid points on the virtual grid to minimize a total wirelength (TWL) cost function of nets in the interconnect area;

inserting timing slices in the floorplan after placement of the fabric components to the updated locations; and providing the floorplan information, including the placement of the fabric components and the timing slices, to generate a physical design of the interconnect.

18. The non-transitory computer readable medium of claim 17, wherein determining the updated locations for the placement of the fabric components on the virtual grid includes:

for each fabric component:
performing a location swapping operation to swap an initial location of a given fabric component with another location in the virtual grid; and performing a location insertion and stretching operation to further update the location of the given fabric component.

19. The non-transitory computer readable medium of claim 18, wherein performing the location swapping operation includes:
   determining a location on the virtual grid for the given fabric component that has an optimal half perimeter wirelength (HPWL) of connections to the given fabric component;
   determining a respective improvement in the HPWL when swapping the initial location of the given fabric component to each grid point in a set of grid points within a region surrounding the location of the HPWL; and
   swapping the location of the given fabric component to a new grid point within the region that has a highest HPWL improvement.

20. The non-transitory computer readable medium of claim 18, wherein performing the location insertion and stretching operation includes:
   determining a location on the virtual grid for placement of the given fabric component that has an optimal HPWL of connections to the given fabric component;
   moving the given fabric component to a grid point corresponding to the determined location;
   upon determining that there is another fabric component at the determined location, moving the other fabric component to a nearest empty grid point on the virtual grid;
   computing a respective HPWL for each fabric component that has moved to an updated location; and
   for each fabric component that has an improvement in the respective HPWL, placing the fabric component at the updated location.

* * * * *